(12) United States Patent
Henry et al.

(10) Patent No.: US 8,495,343 B2
(45) Date of Patent: Jul. 23, 2013

(54) APPARATUS AND METHOD FOR DETECTION AND CORRECTION OF DENORMAL SPECULATIVE FLOATING POINT OPERAND

(75) Inventors: G. Glenn Henry, Austin, TX (US);
Gerard M. Col, Austin, TX (US);
Timothy A. Elliott, Austin, TX (US);
Rodney E. Hooker, Austin, TX (US);
Terry Parks, Austin, TX (US)

(73) Assignee: VIA Technologies, Inc., New Taipei (TW)

( * ) Notice: Subject to any disclaimer, the term of this patent is extended or adjusted under 35 U.S.C. 154(b) by 557 days.

(21) Appl. No.: 12/793,821

(22) Filed: Jun. 4, 2010

(65) Prior Publication Data
US 2011/0060943 A1 Mar. 10, 2011

Related U.S. Application Data

(60) Provisional application No. 61/240,696, filed on Sep. 9, 2009.

(51) Int. Cl.
*G06F 9/00* (2006.01)
(52) U.S. Cl.
USPC .......................................... 712/222; 712/220

(58) Field of Classification Search
None
See application file for complete search history.

(56) References Cited

U.S. PATENT DOCUMENTS 6,487,653 B1 * 11/2002 Oberman et al. ............. 712/222
2010/0250639 A1 * 9/2010 Olson et al. .................. 708/504

* cited by examiner

*Primary Examiner* — Andrew Caldwell
*Assistant Examiner* — Benjamin Geib
(74) *Attorney, Agent, or Firm* — Gary Stanford; James W. Huffman

(57) ABSTRACT

A microprocessor includes a plurality of execution units configured to receive instructions and operands thereof and to execute the instructions. An instruction scheduler issues the instructions to the execution units and selects sources of the instruction operands. At least one of the execution units detects one of the operands of one of the instructions is a denormal operand, generates an indication that the instruction needs to be replayed in response to detecting the denormal operand, and provides the denormal operand to the instruction scheduler in response to detecting the denormal operand, rather than normalizing the denormal operand. The instruction scheduler normalizes the denormal operand, in response to the indication, and causes the normalized operand, rather than the denormal operand, to be provided to the execution unit when the instruction is replayed.

25 Claims, 2 Drawing Sheets

APPARATUS AND METHOD FOR DETECTION AND CORRECTION OF DENORMAL SPECULATIVE FLOATING POINT OPERAND

CROSS REFERENCE TO RELATED APPLICATION(S)

This application claims priority based on U.S. Provisional Application Ser. No. 61/240,696, filed Sep. 9, 2009, entitled APPARATUS AND METHOD FOR DETECTION AND CORRECTION OF DENORMAL SPECULATIVE FLOATING POINT OPERAND, which is hereby incorporated by reference in its entirety.

FIELD OF THE INVENTION

The present invention relates in general to the field of the computation of floating-point numbers in a microprocessor, and particularly to floating-point computation with denormal numbers.

BACKGROUND OF THE INVENTION

In the context of floating point numbers represented within a microprocessor, non-zero finite numbers, or operands, are divided into two classes: normalized (or normal) and denormalized (or denormal) numbers. This is discussed in more detail, for example, in sections 4.8.2.1 and 4.8.3.2 of the IA-32 Intel Architecture Software Developer's Manual, Volume 1: Basic Architecture, 2002, Order Number 245470-008, published by the Intel Corporation, which are hereby incorporated by reference, and which will be briefly summarized here. A normal number, or normalized number, or number encoded in normalized form, has a significand made up of a real number between 1 and 2 (i.e., an integer 1 bit followed by bits that make up a fraction) and an exponent that specifies the location of the binary point in the number. When a floating-point number becomes very close to zero, the normalized number format can no longer be used to represent the number because the range of the exponent is not large enough to compensate for shifting the binary point to the right to eliminate leading zeroes. When the (biased) exponent is zero, smaller numbers can only be represented by making the integer bit (and perhaps other leading bits) of the significand zero. The numbers in this range are called denormal numbers, or denormalized numbers, or numbers in denormalized form. The use of leading zeros with denormalized numbers allows smaller numbers to be represented. However, this denormalization causes a loss of precision (the number of significant bits in the fraction is reduced by the leading zeros).

Generally speaking, floating point units within a microprocessor are designed to perform computations on operands in normalized form. Therefore, when an instruction specifies a denormal operand, the microprocessor converts it into a normal operand in order to perform the computation specified by the instruction. This process may increase instruction execution latency by consuming a relatively large amount of time and/or require a non-constant amount of time to perform, which introduces problems as discussed in more detail below.

BRIEF SUMMARY OF INVENTION

In one aspect the present invention provides a microprocessor. The microprocessor includes a plurality of execution units configured to receive instructions and operands thereof and to execute the instructions. The microprocessor also includes an instruction scheduler configured to issue the instructions to the execution units and to select sources of the instruction operands. At least one of the execution units is configured to: detect one of the operands of one of the instructions is a denormal operand; generate an indication that the instruction needs to be replayed, in response to detecting the denormal operand; and provide the denormal operand to the instruction scheduler, in response to detecting the denormal operand, rather than normalizing the denormal operand. The instruction scheduler is configured to: normalize the denormal operand, in response to the indication; and cause the normalized operand, rather than the denormal operand, to be provided to the execution unit when the instruction is replayed.

In another aspect, the present invention provides a method for processing an instruction that specifies a denormal operand in a microprocessor that includes an execution unit and an instruction scheduler. The method includes detecting the operand of the instruction is a denormal operand, wherein the detecting is performed by the execution unit. The method also includes generating an indication that the instruction needs to be replayed, in response to the detecting the denormal operand, wherein the generating the indication is performed by the execution unit. The method also includes providing the denormal operand to the instruction scheduler, in response to the detecting the denormal operand, wherein the providing the denormal operand is performed by the execution unit. The method also includes normalizing the denormal operand, in response to the indication, wherein the normalizing is performed by the instruction scheduler rather than by the execution unit. The method also includes replaying the instruction, after the providing the denormal operand. The method also includes providing the normalized operand, rather than the denormal operand, to the execution unit, in response to the replaying the instruction.

In yet another aspect, the present invention provides a computer program product encoded in at least one computer readable medium for use with a computing device, the computer program product comprising computer readable program code embodied in said medium for specifying a microprocessor. The computer readable program code includes first program code for specifying a plurality of execution units configured to receive instructions and operands thereof and to execute the instructions. The computer readable program code also includes second program code for specifying an instruction scheduler, configured to issue the instructions to the execution units and to select sources of the instruction operands. At least one of the execution units is configured to: detect one of the operands of one of the instructions is a denormal operand; generate an indication that the instruction needs to be replayed, in response to detecting the denormal operand; and provide the denormal operand to the instruction scheduler, in response to detecting the denormal operand, rather than normalizing the denormal operand. The instruction scheduler is configured to: normalize the denormal operand, in response to the indication; and cause the normalized operand, rather than the denormal operand, to be provided to the execution unit when the instruction is replayed.

In yet another aspect, the present invention provides a microprocessor. The microprocessor includes microcode and a plurality of execution units configured to receive instructions and operands thereof and to execute the instructions. At least one of the execution units is configured to: detect one of the operands of one of the instructions is a denormal operand; and generate an indication that the instruction needs to be replayed, in response to detecting the denormal operand. The microprocessor is configured to invoke the microcode, in response to the indication. The microcode is configured to normalize the denormal operand. The microprocessor is configured to cause the normalized operand, rather than the denormal operand, to be provided to the execution unit when the instruction is replayed.

DETAILED DESCRIPTION OF THE INVENTION

Figure 1:
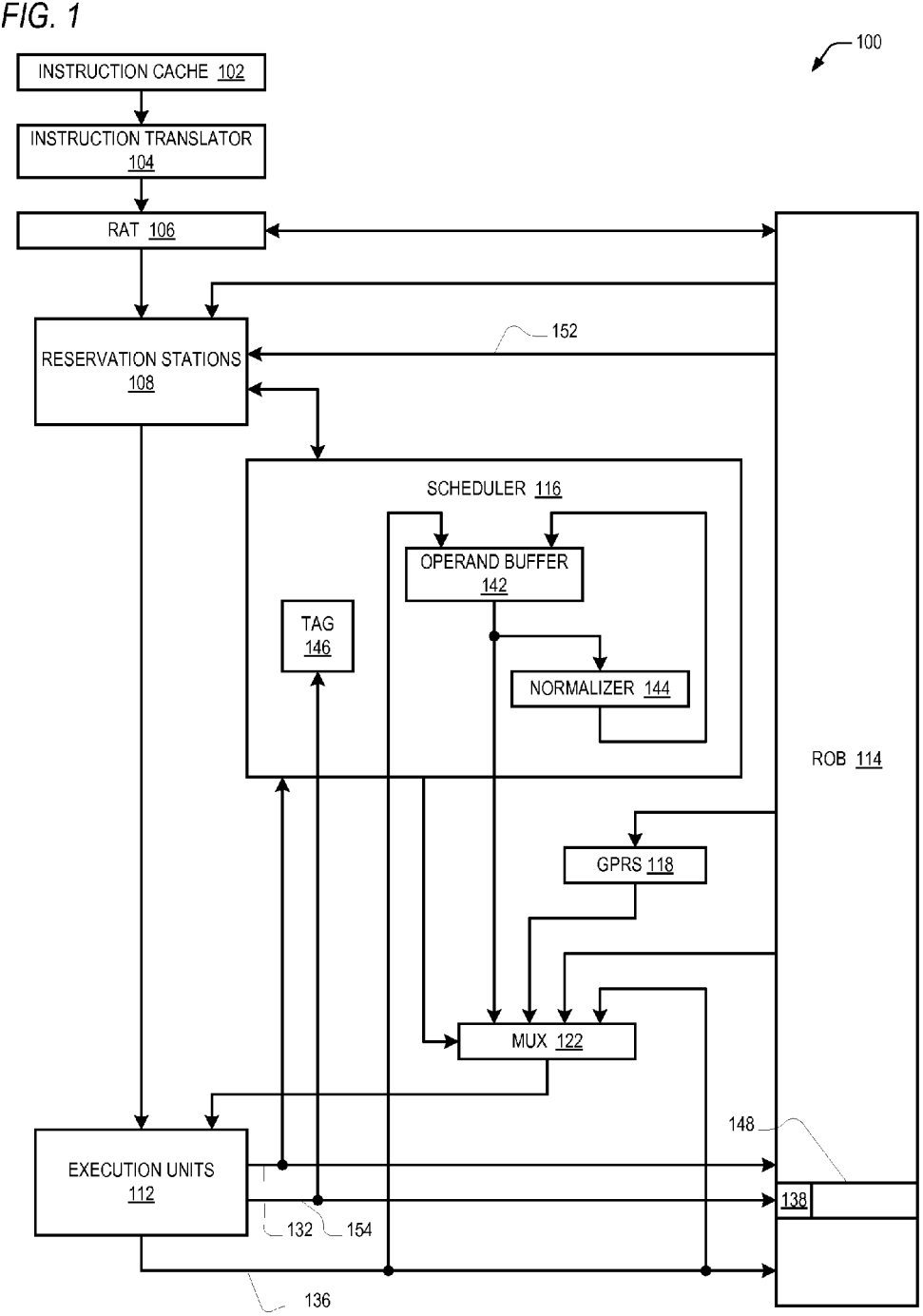
FIG. 1 is a block diagram illustrating a microprocessor.

Referring now to FIG. 1, a block diagram illustrating a microprocessor 100 is shown. The microprocessor 100 includes an instruction cache 102 that caches program instructions from system memory. An instruction translator 104 receives the program instructions from the instruction cache 102 and translates them into microinstructions. A register alias table (RAT) 106 receives the microinstructions in program order from the instruction translator 104. The RAT 106 allocates an entry 148 in a reorder buffer (ROB) 114 for each microinstruction, generates dependency information for the microinstructions, and dispatches the microinstructions and their dependency information in program order to reservation stations 108. Each entry 148 in the ROB 114 holds information associated with the instruction, including a flag 138 that indicates whether or not the instruction must be replayed because it specifies a denormal operand, as discussed in more detail below.

The microinstructions are issued for execution to execution units 112. In one embodiment, each execution unit 112 has its own corresponding reservation station 108 for holding instructions to be issued to it. The execution units 112 provide their results on result buses 136 to the ROB 114. When an execution unit 112, namely a floating point unit 112, detects that it has received an instruction to execute that has one or more denormal operands, and the floating point unit 112 is not capable of performing the requested operation on a denormal operand, the floating point unit 112 outputs a tag 154 that specifies the entry 148 in the ROB 114 allocated to the instruction. The tag 154 is an index into the array of ROB 114 entries 148. Additionally, the floating point unit 112 asserts a signal 132 to the ROB 114 to cause the ROB 114 to set the flag 138 in the entry 148 associated with the instruction. When an instruction becomes the oldest instruction in the microprocessor 100 and the flag 138 indicates that it needs to be replayed, the ROB 114 asserts a replay signal 152 to the reservation stations 108 to indicate this condition and provides to the reservation stations 108 the instructions that are to be replayed.

A plurality of muxes 122 provide instruction operands to the execution units 112. The muxes 122 receive operands from a plurality of sources: the result feedback buses 136 from the execution units 112 themselves; temporary result registers associated with the ROB 114; an architected register set 118; and an operand buffer 142 within a scheduler unit 116. The scheduler 116 issues the instructions from the reservation stations 108 to the execution units 112 and selects the sources of the instruction operands for provision to the execution units 112 along with their corresponding instructions.

The scheduler 116 includes a tag buffer 146 that receives the tag 154 from the floating point unit 112. The scheduler 116 also receives the indicator 132 that indicates the floating point unit 112 has detected an instruction that specifies a denormal operand. The scheduler 116 also includes the operand buffer 142 that receives the denormal operand from the floating point unit 112 result bus 136. The scheduler 116 also includes a normalizer 144 that receives the denormal operand from the operand buffer 142 and converts it to a normalized form operand and writes the normalized operand back to the operand buffer 142. In one embodiment, the normalizer 144 is a shifter that left-shifts the significand of the denormal operand until it is normalized (i.e., until the integer bit location contains a binary '1' bit) and decrements the exponent of the denormal operand by an amount equal to the number of bit locations the significand is left-shifted. In one embodiment, each clock cycle the normalizer 144 shifts the significand left one bit, decrements the exponent by one, and writes the intermediate result back into the operand buffer 142. In one embodiment, the data format of the operands that are processed by the floating point unit 112 is different from the architected operand format specified by the instructions. That is, the floating point unit 112 includes a converter to convert an architected data format operand into the non-architected data format for processing by the floating point unit 112 and includes a converter to convert the non-architected data format result back to the architected data format for retirement to the GPRs 118. The non-architected data format includes additional exponent bits to accommodate the normalization of denormal numbers. In particular, when the normalizer 144 converts a denormal operand to a normal operand, it converts the denormal operand from the architected data format to the non-architected data format.

Figure 2:
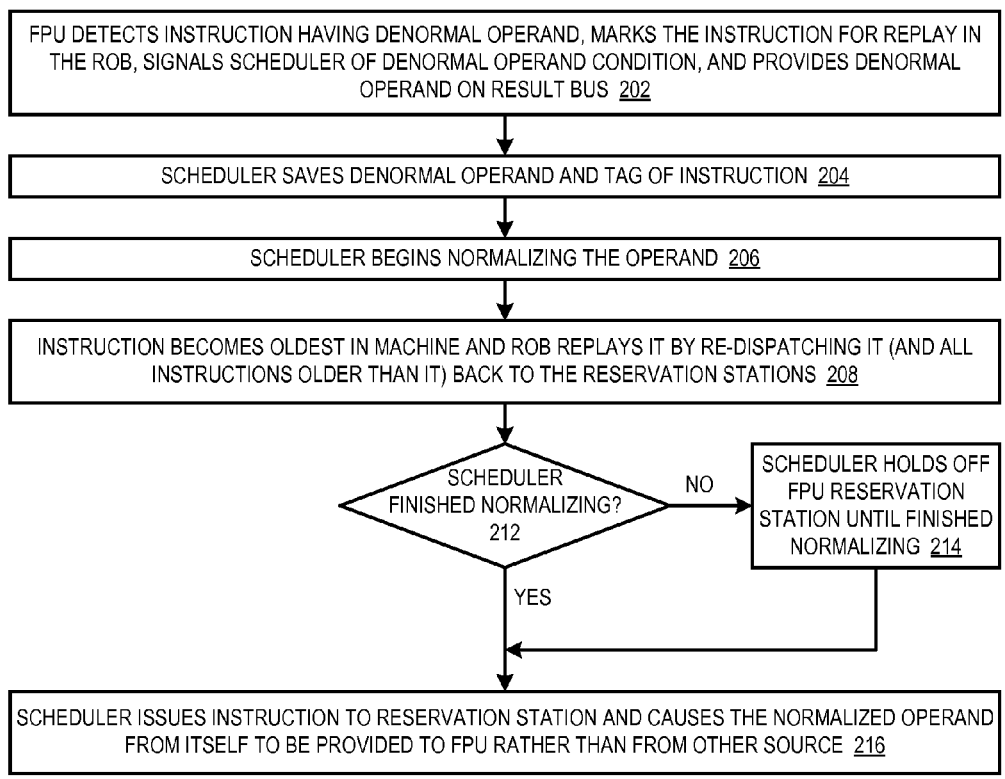
FIG. 2 is a flowchart illustrating operation of the microprocessor of FIG. 1.

Referring now to FIG. 2, a flowchart illustrating operation of the microprocessor 100 of FIG. 1 is shown. Flow begins at block 202.

At block 202, the floating point unit 112 detects that it has received an instruction that specifies a denormal operand. The floating point unit 112 responsively outputs the tag 154 of the instruction, asserts the signal 132 to indicate this condition to the scheduler 116 and to the ROB 114, and outputs the denormal operand on its result bus 136 rather than outputting the result it generated. Flow proceeds to block 204.

At block 204, the scheduler 116 loads the denormal operand from the result bus 136 into the operand buffer 142 and saves the tag 154 in its tag buffer 146 and notes the denormal operand condition. In one embodiment, the scheduler 116 is capable of processing only one instruction that has the denormal operand condition at a time. In this embodiment, the scheduler 116 compares the tag 154 of the new instruction with the tag buffer 146 value, and if the new instruction is older than the instruction whose operand the scheduler 116 is currently normalizing, the scheduler 116 abandons the current instruction, updates the tag buffer 146 with the new tag 154 value, and begins normalizing the new instruction's operand at block 206. Flow proceeds to block 206.

At block 206, the scheduler 116 begins normalizing the denormal operand in the operand buffer 142. Flow proceeds to block 208.

At block 208, the instruction with the denormal operand becomes the oldest instruction in the microprocessor 100 and the ROB 114 notes the flag 138 indicating a replay is needed. Responsively, the ROB 114 asserts the replay signal 152 to cause the instruction to be replayed back to the reservation stations 108. In one embodiment, the ROB 114 also replays all instructions older than the instruction; in another embodiment, the ROB 114 only replays instructions older than the instruction and that are dependent upon the instruction. Flow proceeds to decision block 212.

At decision block 212, the scheduler 116 detects that the instruction is being replayed, i.e., the scheduler 116 detects that the valid value in the tag buffer 146 matches the tag of an instruction that is in the reservation stations 108 ready to be issued for execution. If the scheduler 116 determines that it has completed normalizing the denormal operand into the operand buffer 142, flow proceeds to block 216; otherwise, flow proceeds to block 214.

At block 214, the scheduler 116 holds off the floating point unit 112 reservation station 108 until the scheduler 116 has finished normalizing the denormal operand. Flow proceeds to block 216.

At block 216, the scheduler 116 issues the instruction from the reservation station 108 to the floating point unit 112 and controls the mux 122 to cause the normalized operand from the operand buffer 142 to be provided to the floating point unit 112, rather than from the normal source of the operand, such as from the GPRs 118, ROB 114, or result bus 136. The floating point unit 112 then executes the instruction using the normalized operand. It is noted that an instruction may include more than one operand that is in a denormal form. In one embodiment, when the instruction is replayed with the operand that has been normalized by the scheduler 116, if the floating point unit 112 detects a denormal operand (i.e., a second denormal operand, since the first denormal operand has now been normalized), it again asserts signal 132 and tag 154 such that the scheduler 116 will normalize the second denormal operand and the ROB 114 will replay the instruction once again according to the flowchart of FIG. 2. Flow ends at block 216.

The present inventors have observed that the occurrence of denormal operands is relatively rare such that, in the vast majority of data sets processed by programs executing on the microprocessor 100, the benefits obtained by assuming normalized operands outweigh the penalty associated with incurring the delay of replaying an instruction that includes a denormal operand. Some of the benefits are derived from the fact that the scheduler issues instructions on a fixed execution time basis. That is, the scheduler knows exactly how many clocks it will take a given execution unit to execute a given type of instruction. One benefit is reduced complexity in the scheduler. Another benefit is increased performance from being able to issue instructions earlier than if the scheduler 116 waits until it knows that an execution unit has completed execution of a variable execution time instruction. That is, assume instruction B has a dependency on older instruction A. Assume there is some known delay X between the time the scheduler issues an instruction and it arrives at the execution unit for execution. With a fixed execution time, the scheduler can issue instruction B by X clocks before instruction A is complete because the scheduler knows exactly when the execution unit 112 executing instruction A will provide its result. The benefits are achieved at the cost of a relatively rare replay delay.

A conventional solution is to position the reservation stations at the execution units so that they can be replayed internally within the execution unit rather than replayed externally by the ROB and to configure the reservation stations to hold the instruction operands for the instructions. This has the disadvantages of the variable execution time and increased size of the reservation stations in order to hold the instruction operands. In contrast, our solution enables a fixed execution time and allows our reservation stations to be small because they do not have to hold the operands; rather, the operands are supplied on the fly from the various sources. Another conventional solution is to include a large and time/power-expensive fixed execution time normalizer circuit in the FPU in order to retain the fixed execution time regime.

Although embodiments have been described in which the scheduler 116 converts the denormal operand to a normal operand, an alternate embodiment is contemplated in which microcode executed by a microcode unit of the microprocessor 100 converts the denormal operand to a normal operand in response to the floating point unit 112 causing the microprocessor 100 to take an internal exception if it detects a denormal source operand.

While various embodiments of the present invention have been described herein, it should be understood that they have been presented by way of example, and not limitation. It will be apparent to persons skilled in the relevant computer arts that various changes in form and detail can be made therein without departing from the scope of the invention. For example, software can enable, for example, the function, fabrication, modeling, simulation, description and/or testing of the apparatus and methods described herein. This can be accomplished through the use of general programming languages (e.g., C, C++), hardware description languages (HDL) including Verilog HDL, VHDL, and so on, or other available programs. Such software can be disposed in any known computer usable medium such as magnetic tape, semiconductor, magnetic disk, or optical disc (e.g., CD-ROM, DVD-ROM, etc.), a network, wire line, wireless or other communications medium. Embodiments of the apparatus and method described herein may be included in a semiconductor intellectual property core, such as a microprocessor core (e.g., embodied in HDL) and transformed to hardware in the production of integrated circuits. Additionally, the apparatus and methods described herein may be embodied as a combination of hardware and software. Thus, the present invention should not be limited by any of the exemplary embodiments described herein, but should be defined only in accordance with the following claims and their equivalents. Specifically, the present invention may be implemented within a microprocessor device which may be used in a general purpose computer. Finally, those skilled in the art should appreciate that they can readily use the disclosed conception and specific embodiments as a basis for designing or modifying other structures for carrying out the same purposes of the present invention without departing from the scope of the invention as defined by the appended claims.

We claim:

1. A microprocessor, comprising:
   a plurality of execution units, configured to receive instructions and operands thereof and to execute the instructions; and
   an instruction scheduler, configured to issue the instructions to the execution units and to select sources of the instruction operands;
   wherein at least one of the execution units is configured to:
      detect one of the operands of one of the instructions is a denormal operand;
      generate an indication that the instruction needs to be replayed, in response to detecting the denormal operand; and
      provide the denormal operand to the instruction scheduler, in response to detecting the denormal operand, rather than normalizing the denormal operand;
   wherein the instruction scheduler is configured to:
      normalize the denormal operand, in response to the indication; and
      cause the normalized operand, rather than the denormal operand, to be provided to the execution unit when the instruction is replayed.

2. The microprocessor of claim 1, wherein if the instruction scheduler has not completed normalizing the denormal operand when the instruction is replayed, the instruction scheduler is configured to wait to issue the instruction to the execution unit until the instruction scheduler has completed normalizing the denormal operand.

3. The microprocessor of claim 1, further comprising:
a reorder buffer, coupled to the execution units, the reorder buffer comprising a plurality of entries each for storing execution information for an instruction, each of the plurality of entries having a flag for indicating whether its instruction needs to be replayed;
wherein the reorder buffer is configured to set the flag of the instruction's entry in response to the indication generated by the execution unit that the instruction needs to be replayed.

4. The microprocessor of claim 3, wherein the reorder buffer is configured to replay the instruction when it becomes the oldest instruction in the reorder buffer, in response to detecting that the flag in the instruction's entry is set.

5. The microprocessor of claim 3, wherein the execution unit is configured to provide to the reorder buffer a tag identifying the instruction's entry in the reorder buffer, in response to detecting the denormal operand, wherein the reorder buffer is configured to use the tag to set the flag.

6. The microprocessor of claim 3, wherein the execution unit is configured to provide to the instruction scheduler a tag identifying the instruction's entry in the reorder buffer, in response to detecting the denormal operand, wherein the instruction scheduler is configured to store the tag and to subsequently use the stored tag to detect when the instruction is replayed.

7. The microprocessor of claim 1, further comprising:
a bus, coupled to the execution unit;
wherein during an initial execution instance of the instruction, the execution unit is configured to provide on the bus to the instruction scheduler the denormal operand in response to detecting the denormal operand;
wherein during an execution instance of the instruction subsequent to the initial execution instance, the execution unit is configured to provide on the bus a result of the instruction generated by the execution unit using the normalized operand.

8. The microprocessor of claim 1, wherein the execution unit is configured to:
detect a second operand of the instruction is a denormal operand;
generate a second indication that the instruction needs to be replayed, in response to detecting the second denormal operand; and
provide the second denormal operand to the instruction scheduler, in response to detecting the second denormal operand, rather than normalizing the second denormal operand;
wherein the instruction scheduler is configured to:
normalize the second denormal operand, in response to the second indication; and
cause the second normalized operand, rather than the second denormal operand, to be provided to the execution unit when the instruction is replayed.

9. The microprocessor of claim 1, wherein if the instruction scheduler is storing the normalized operand for the first instruction prior to the replay of the first instruction and the execution unit generates an indication that a second instruction needs to be replayed because it has a denormal operand and the second instruction is newer in program order than the first instruction, then the instruction scheduler is configured to abandon the normalized operand of the first instruction and begin normalizing the denormal operand of the second instruction.

10. The microprocessor of claim 1, wherein the execution unit is configured without a circuit for normalizing denormal numbers, wherein the instruction scheduler is configured with a circuit configured to normalize the denormal operand.

11. The microprocessor of claim 10, wherein because the execution unit provides the denormal operand to the instruction scheduler, in response to detecting the denormal operand, rather than normalizing the denormal operand itself, the execution unit executes the instruction in a fixed execution time which enables the instruction scheduler to issue instructions to the execution units on a fixed execution time basis.

12. The microprocessor of claim 1, further comprising:
reservation stations, configured to hold the instructions while waiting to be issued by the instruction scheduler to the execution units, wherein the reservation stations are configured without storage for storing the instruction operands.

13. A method for processing an instruction that specifies a denormal operand in a microprocessor that includes an execution unit and an instruction scheduler, the method comprising:
detecting the operand of the instruction is a denormal operand, wherein said detecting is performed by the execution unit;
generating an indication that the instruction needs to be replayed, in response to said detecting the denormal operand, wherein said generating the indication is performed by the execution unit;
providing the denormal operand to the instruction scheduler, in response to said detecting the denormal operand, wherein said providing the denormal operand is performed by the execution unit;
normalizing the denormal operand, in response to the indication, wherein said normalizing is performed by the instruction scheduler rather than by the execution unit;
replaying the instruction, after said providing the denormal operand; and
providing the normalized operand, rather than the denormal operand, to the execution unit, in response to said replaying the instruction.

14. The method of claim 13, further comprising:
determining that the instruction scheduler has not completed normalizing the denormal operand, in response to said replaying the instruction; and
waiting to issue the instruction to the execution unit until the instruction scheduler has completed normalizing the denormal operand.

15. The method of claim 13, wherein the microprocessor also includes a reorder buffer comprising a plurality of entries each for storing execution information for an instruction, each of the plurality of entries having a flag for indicating whether its instruction needs to be replayed, the method further comprising:
setting the flag of the instruction's entry, in response to said generating an indication that the instruction needs to be replayed.

16. The method of claim 15, further comprising:
replaying the instruction when it becomes the oldest instruction in the reorder buffer, in response to detecting that the flag in the instruction's entry is set.

17. The method of claim 15, further comprising:
providing to the reorder buffer a tag identifying the instruction's entry in the reorder buffer, in response to said detecting the denormal operand.

18. The method of claim 15, further comprising:
  providing to the instruction scheduler a tag identifying the instruction's entry in the reorder buffer, in response to said detecting the denormal operand; and
  storing the tag and subsequently using the stored tag to detect when the instruction is replayed, wherein said storing and using the tag are performed by the instruction scheduler.

19. The method of claim 13, wherein the microprocessor also includes a bus coupled to the execution unit, the method further comprising:
  during an initial execution instance of the instruction, providing on the bus to the instruction scheduler the denormal operand in response to said detecting the denormal operand, wherein said providing on the bus to the instruction scheduler the denormal operand is performed by the execution unit;
  during an execution instance of the instruction subsequent to the initial execution instance, providing on the bus a result of the instruction generated by the execution unit using the normalized operand, wherein said providing on the bus the result of the instruction is performed by the execution unit.

20. The method of claim 13, further comprising:
  detecting a second operand of the instruction is a second denormal operand, wherein said detecting the second operand is performed by the execution unit;
  generating an indication that the instruction needs to be replayed, in response to said detecting the second denormal operand, wherein said generating the indication is performed by the execution unit;
  providing the second denormal operand to the instruction scheduler, in response to said detecting the second denormal operand, wherein said providing the second denormal operand is performed by the execution unit;
  normalizing the second denormal operand, in response to the second indication, wherein said normalizing the second operand is performed by the instruction scheduler rather than by the execution unit;
  replaying the instruction, after said providing the second denormal operand; and
  providing the second normalized operand, rather than the second denormal operand, to the execution unit, in response to said replaying the instruction.

21. The method of claim 13, further comprising:
  detecting a condition in which: (1) the instruction scheduler is storing the normalized operand for the first instruction prior to the replay of the first instruction, (2) the execution unit has generated an indication that a second instruction needs to be replayed because it has a denormal operand, and (3) the second instruction is newer in program order than the first instruction;
  abandoning the normalized operand of the first instruction and normalizing the denormal operand of the second instruction, in response to said detecting said condition, wherein said abandoning is performed by the instruction scheduler.

22. The method of claim 13, wherein the execution unit is configured without a circuit for normalizing denormal numbers, wherein the instruction scheduler is configured with a circuit configured to normalize the denormal operand.

23. The method of claim 22, wherein because the execution unit provides the denormal operand to the instruction scheduler, in response to detecting the denormal operand, rather than normalizing the denormal operand itself, the execution unit executes the instruction in a fixed execution time which enables the instruction scheduler to issue instructions to the execution units on a fixed execution time basis.

24. The method of claim 13, wherein the microprocessor also includes reservation stations configured to hold the instructions while waiting to be issued by the instruction scheduler to the execution units, wherein the reservation stations are configured without storage for storing the instruction operands.

25. A computer program product encoded in at least one non-transitory computer readable medium for use with a computing device, the computer program product comprising:
  non-transitory computer readable program code embodied in said medium, for specifying a microprocessor, the non-transitory computer readable program code comprising:
    first program code for specifying a plurality of execution units, configured to receive instructions and operands thereof and to execute the instructions; and
    second program code for specifying an instruction scheduler, configured to issue the instructions to the execution units and to select sources of the instruction operands;
  wherein at least one of the execution units is configured to:
    detect one of the operands of one of the instructions is a denormal operand;
    generate an indication that the instruction needs to be replayed, in response to detecting the denormal operand; and
    provide the denormal operand to the instruction scheduler, in response to detecting the denormal operand, rather than normalizing the denormal operand;
  wherein the instruction scheduler is configured to:
    normalize the denormal operand, in response to the indication; and
    cause the normalized operand, rather than the denormal operand, to be provided to the execution unit when the instruction is replayed.

* * * * *